United States Patent
Chen et al.

(10) Patent No.: US 10,666,328 B2
(45) Date of Patent: May 26, 2020

(54) USER COMMUNICATION DEVICE AND METHOD FOR CELLULAR COMMUNICATION WITH A BASE STATION AND D2D COMMUNICATION

(71) Applicant: HUAWEI TECHNOLOGIES CO., LTD., Shenzhen, Guangdong (CN)

(72) Inventors: Junting Chen, Antibes (FR); Haifan Yin, Antibes (FR); Laura Cottatellucci, Antibes (FR); David Gesbert, Roquefort-les-Pins (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/394,788

(22) Filed: Apr. 25, 2019

(65) Prior Publication Data
US 2019/0253110 A1  Aug. 15, 2019

Related U.S. Application Data

(63) Continuation of application No. PCT/EP2016/075849, filed on Oct. 26, 2016.

(51) Int. Cl.
*H04B 7/0417*  (2017.01)
*H04B 7/0452*  (2017.01)
(Continued)

(52) U.S. Cl.
CPC ......... *H04B 7/0417* (2013.01); *H04B 7/0452* (2013.01); *H04B 7/0456* (2013.01);
(Continued)

(58) Field of Classification Search
CPC .... H04B 7/0417; H04B 7/0639; H04B 7/065; H04B 7/0456; H04B 7/0626; H04B 7/0452
See application file for complete search history.

(56) References Cited

U.S. PATENT DOCUMENTS

2014/0364133 A1* 12/2014 Chae ................... H04W 72/082
455/450
2015/0043398 A1* 2/2015 Fwu ..................... H04L 27/2602
370/280
(Continued)

OTHER PUBLICATIONS

Liu, Yinsheng et al., "Device-to-device Cooperation in Massive MIMO Systems with Cascaded Precoding", XP80724388A, Sep. 19, 2016, 6 pages.
(Continued)

*Primary Examiner* — Kenneth T Lam
(74) *Attorney, Agent, or Firm* — Slater Matsil, LLP (57) ABSTRACT

The invention relates a user communication device for cellular communication with a base station and D2D communication with at least one user communication device. The user communication device comprises: a communication interface configured for cellular communication with the base station and D2D communication via a D2D communication channel between the user communication device and the user communication device, the D2D communication with the further user communication device comprises receiving channel state information from the further communication device, the channel state information comprises channel state information of a cellular communication channel between the further user communication device and the base station; and a processor configured to adapt a feedback vector on the basis of a quality measure of the D2D communication channel between the further user communication device and the user communication device and to provide information about the adapted feedback vector via the communication interface to the base station.

14 Claims, 6 Drawing Sheets

(51) Int. Cl.
*H04B 7/06* (2006.01)
*H04B 7/0456* (2017.01)
(52) U.S. Cl.
CPC .......... *H04B 7/065* (2013.01); *H04B 7/0626* (2013.01); *H04B 7/0639* (2013.01)

(56) References Cited

U.S. PATENT DOCUMENTS

| | | | | |
|---|---|---|---|---|
| 2015/0049736 | A1* | 2/2015 | Liu | H04W 72/04 370/331 |
| 2015/0171944 | A1* | 6/2015 | Kalhan | H04W 76/14 370/329 |
| 2016/0255669 | A1* | 9/2016 | Fodor | H04W 76/14 370/329 |
| 2017/0310375 | A1* | 10/2017 | Kim | H04L 1/0026 |

OTHER PUBLICATIONS

Chen, Junting et al., "Precoder Feedback versus Channel Feedback in Massive MIMO under User Cooperation", in Proc. Asilomar Conf. on Signals, Systems, and Computers, Nov. 2015, 5 pages.
Dabbagh, Amir D., et al., "Multiple Antenna MMSE Based Downlink Precoding with Quantized Feedback or Channel Mismatch," IEEE Transactions on Communications, vol. 56, No. 11, pp. 1859-1868, Nov. 2008.
Bhagavatula, Ramya et al., "Adaptive Limited Feedback for Sum-Rate Maximizing Beamforming in Cooperative Multicell Systems", IEEE Transactions on Signal Processing, vol. 59, No. 2, Feb. 2011, pp. 800-811.
Clerckx, Bruno et al., "Allocation of Feedback Bits Among Users in Broadcast MIMO Channels", In IEEE Global Telecommunications Conference, IEEE Globecom Telecommunications Conference, Nov. 30-Dec. 4, 2008, 5 pages.
Clerckx, Bruno et al., "MU-MIMO with Channel Statistics-Based Codebooks in Spatially Correlated Channels", IEEE Global Telecommunications Conference, Nov. 30-Dec. 4, 2008, 5 pages.
Jindal, Nihar "MIMO Broadcast Channels with Finite-Rate Feedback", IEEE Transactions on Information Theory, 52 (11), pp. 5045-5060, 34 pages.
Lee, Namyoon et al., "Two-Cell MISO Interfering Broadcast Channel with Limited Feedback: Adaptive Feedback Strategy and Multiplexing Gains", IEEE International Conference on Communications, Jun. 5-9, 2011, 5 pages.
Love, David J., et al., "Limited Feedback Diversity Techniques for Correlated Channels", IEEE Transactions on Vehicular Technology, vol. 55, No. 2, Mar. 2006, pp. 718-722; 5 pages.
Rao, Xiongbin et al., "Limited Feedback Design for Interference Alignment on MIMO Interference Networks with Heterogeneous Path Loss and Spatial Correlations", IEEE Transactions on Signal Processing, vol. 61, No. 10, May 15, 2013, pp. 2598-2607, 10 pages.
Ravindran, Niranjay et al., "Beamforming with Finite Rate Feedback for LOS MIMO Downlink channels", IEEE Global Telecommunications Conference, Nov. 26-30, 2007, pp. 4200-4204, 5 pages.
Xia, Pengfei et al., "Design and Analysis of Transmit-Beamforming Based on Limited-Rate Feedback", IEEE Transactions on Signal Processing, vol. 54, No. 5, May 2006, pp. 1853-1863, 11 pages.
Yin, Haifan et al., "Enabling Massive MIMO Systems in the FDD Mode Thanks to D2D Communications", Proc. Asilomar Conf. on Signals, Systems, and Computers, Pacific Grove, CA, Nov. 2014, 5 pages.
Yoo, Taesang et al., "Multi-Antenna Downlink Channels with Limited Feedback and User Selection", IEEE Journal on Selected Areas in Communications, vol. 25, No. 7, Sep. 2007, pp. 1478-1491, 14 pages.
Yuan, Fang et al., "Bit Allocation Between Per-Cell Codebook and Phase Ambiguity Quantization for Limited Feedback Coordinated Multi-Point Transmission Systems", IEEE Transactions on Communications, vol. 60, No. 9, pp. 2546-2559, 14 pages.
Chen, Junting et al.,"Advanced Massive MIMO Algorithms", Phase 3 Report, Apr. 5, 2016, 98 pages.
Yin, Haifan et al., "Advanced Massive MIMO Algorithms", Phase 2 Report, Oct. 5, 2015, 95 pages.
Lin, Xingqin et al., "The Interplay between Massive MIMO and Underlaid D2D Networking", IEEE Transactions on Wireless Communications, vol. 14, No. 6, Jun. 2015, 15 pages.
Lin, Xingqin et al., "Spectral Efficiency of Massive MIMO Systems with D2D Underlay", 2015 IEEE International Conference on Communications (ICC), London, Jun. 8-12, 2015, pp. 4345-4350.
Shalmashi, Serveh et al., "Energy Efficiency and Sum Rate When Massive MIMO Meets Device-to-Device Communication", IEEE Intel. Conf. Commu. Workshop (ICCW), May 7, 2015, pp. 627-632.
Shalmashi, Serveh et al., "Closed-Form Optimality Characterization of Network-Assisted Device-to-Device Communications", IEEE Wireless Communications and Networking Conference (WCNC), Apr. 6-9, 2014, pp. 508-513.
Hajri, Salah Eddine et al., "An Exclusion zone for Massive MIMO With Underlay D2D Communication", IEEE International Symposium on Wireless Communications Systems (ISWCS), Aug. 25-28, 2015, 5 pages.
Au-Yueng, Chun Kin et al., "On the Performance of Random Vector Quantization Limited Feedback Beamforming in a MISO System", IEEE Transactions on Wireless Communications, vol. 6, No. 2, Feb. 2007, pp. 458-462.
International Search Report dated Jul. 17, 2017 in corresponding International Application No. PCT/EP2016/075849.

\* cited by examiner

USER COMMUNICATION DEVICE AND METHOD FOR CELLULAR COMMUNICATION WITH A BASE STATION AND D2D COMMUNICATION

CROSS-REFERENCE TO RELATED APPLICATIONS

This application is a continuation of International Application No. PCT/EP2016/075849, filed on Oct. 26, 2016, the disclosure of which is hereby incorporated by reference in its entirety.

TECHNICAL FIELD

In general, the present invention relates to the field of wireless communications. More specifically, the present invention relates to a user communication device and a method for cellular communication with a base station and D2D communication with a further communication device as well as a corresponding base station.

BACKGROUND

Multiple-input multiple-output (MIMO) is a radio communication technology that exploits multiple transmitters and receivers to transfer data at the same time. MIMO systems can achieve a large throughput via the ample spatial degree of freedoms provided by a large amount of antennas. MIMO has become an essential element of wireless communication standards, such as IEEE 802.11n (Wi-Fi), IEEE 802.11ac (Wi-Fi), and Long Term Evolution (4G), and will also play a major role in 5G network deployments.

To achieve these performance advantages, the transmitter requires instantaneous channel state information (CSI), which can be represented as a vector that contains a large number of elements changing on a fast timescale. In frequency division multiplexing (FDM) systems, the CSI is generally available at the user communication devices and, hence, the user communication devices need to feed the CSI back to the transmitter (e.g., a base station) at every timeslot. Based on the global CSI feedback, the base station computes precoders for all the user communication devices by exploiting spatial multiplexing and by means of these precoders can serve multiple user communication devices simultaneously. This feedback scheme will be referred to herein as "CSI feedback scheme". However, the CSI feedback scheme in multiuser MIMO is challenging, because the uplink resource is limited, and the number of user communication devices to be served opportunistically can be large. In consequence, each user communication device may be allocated only a small number of bits for the CSI feedback.

In parallel to cellular networks, device-to-device (D2D) communication is a fast developing technology that allows user communication devices to directly communicate with each other without having to route the communication via a base station. D2D communication can be implemented in an in-band mode or an out-band mode according to different requirements on spectrum efficiency, quality-of-service, interference level, complexity of scheduling, resource allocation and the like. It is possible that user communication devices can share the CSI among themselves via D2D communication to improve the downlink/uplink transmission in the cellular network provided by a base station.

Several previous works ("Precoder Feedback versus Channel Feedback in Massive MIMO under User Cooperation" by J. Chen, H. Yin, L. Cottatellucci, D. Gesbert, Proc. Asilomar Conf on Signals, Systems, and Computers November 2015; "Enabling massive MIMO systems in the FDD mode thanks to D2D communications" by H. Yin, L. Cottatellucci, D. Gesbert, Proc. Asilomar Conf. on Signals, Systems, and Computers, Pacific Grove, Calif., November 2014; "Advanced massive MIMO algorithms, Phase 2 report" by H. Yin, J. Chen, L. Cottatellucci, and D. Gesbert, 2015) have studied the application of a D2D communication system to the feedback and precoder design of MIMO cellular networks. It has been shown that, in an ideal case, wherein user communication devices have infinite or perfect D2D communication capability and share their CSI perfectly between each other, it is better to return the precoder rather than the CSI as feedback to a base station. More specifically, each user communication device can compute the precoder itself, since the perfect global CSI is available at each user communication device. It has been demonstrated that, when the user communication devices have a very limited number of bits for the feedback to the base station, the precoder feedback scheme significantly outperforms the CSI feedback scheme.

However, practical implementations of the above theoretical studies face several critical problems. Firstly, high-quality D2D communication is not easy to implement in a realistic system. In practice, user communication devices often have only a limited D2D communication capability. Secondly, it is difficult to compute the turning point (i.e., the critical number of feedback bits available in the system) and to determine when to switch from the CSI feedback scheme to the precoder feedback scheme, or vice versa. Intuitively, D2D CSI sharing with limited rates should still benefit the system, but the current existing schemes fail to exploit that. Thirdly, existing methods are not compatible with the CSI feedback scheme. More specifically, they cannot work in a system, wherein some users have D2D links and perform precoder feedback to the base station, while some others have no D2D links at all and hence have to perform CSI feedback to the base station.

Firstly, generally the CSI exchange among users is not perfect. For example, when the D2D communication quality is poor, the users can only transmit signals with a low data rate over D2D system, and the CSI to be exchanged needs to be quantized using a small number of bits, resulting in a large distortion. As a result, the desired feedback and precoding strategy should be robust to the CSI noise due to the limited D2D CSI exchange. Secondly, the users may experience heterogeneous D2D quality, wherein some user pairs may have good D2D quality, while some other user pairs may have poor D2D quality or no D2D communication at all.

Thus, in light of the above there is a need for a more practical and flexible user communication device and base station as well as corresponding methods, which, in particular, allow improving MIMO cellular communications under varying D2D communication capabilities.

SUMMARY

It is an object of the invention to provide for a more practical and flexible user communication device and base station as well as corresponding methods, which, in particular, allow improving MIMO cellular communications under varying D2D communication capabilities.

The foregoing and other objects are achieved by the subject matter of the independent claims. Further implementation forms are apparent from the dependent claims, the description and the figures.

According to a first aspect, the invention relates to a user communication device for cellular communication with a base station and D2D communication with at least one further user communication device. The user communication device comprises: a communication interface configured for cellular communication with the base station and D2D communication via a D2D communication channel between the further user communication device and the user communication device, wherein the D2D communication with the further user communication device comprises receiving channel state information from the further communication device, wherein the channel state information comprises channel state information of a cellular communication channel between the further user communication device and the base station; and a processor configured to adapt a feedback vector on the basis of a quality measure of the D2D communication channel between the further user communication device and the user communication device and to provide information about the adapted feedback vector via the communication interface to the base station.

Thus, a more practical and flexible user communication device is provided, which, in particular, allows improving MIMO cellular communications under varying D2D communication capabilities. In other words, user communication devices according to the first aspect of the invention with or without D2D communication capability can co-exist and can achieve (depending on the D2D communication capabilities) a better data rates than prior art devices. Thus, the present invention bridges the gap between the CSI feedback scheme and the D2D-enabled precoder feedback scheme by combining these two schemes into a robust and adaptive feedback scheme, which benefits the user communication devices with good D2D communication capabilities, but does not sacrifice the performance of the user communication devices without D2D communication capabilities.

In a first possible implementation form of the user communication device according to the first aspect, the processor is configured, in case the quality measure of the D2D communication channel between the further user communication device and the user communication device indicates the D2D communication channel to be perfect to adapt the feedback vector to a precoder vector, wherein the precoder vector is to be applied by the base station for communicating with the user communication device via the cellular communication channel.

In a second possible implementation form of the user communication device according to the first aspect or the first implementation form thereof, the processor is configured, in case the quality measure of the D2D communication channel between the further user communication device and the user communication device indicates the D2D communication channel to be absent to adapt the feedback vector to a channel state information vector or close thereto, wherein the channel state information vector comprises information about the cellular communication channel between the user communication device and the base station.

In a third possible implementation form of the user communication device according to the first aspect or any one of the first to second implementation form thereof, the quality measure of the D2D communication channel between the further user communication device and the user communication device is the quantization error $\sigma_{kj}$ of the channel state information of the D2D communication channel between the further user communication device and the user communication device.

In a fourth possible implementation form of the user communication device according to the third implementation form of the first aspect, the processor is configured to adapt the feedback vector on the basis of the quantization error $\sigma_{kj}$ of the channel state information of the D2D communication channel between the further user communication device and the user communication device by determining a feedback vector from a codebook of feedback vectors, which satisfies the following equation:

$$\hat{u}_k = \underset{u \in C}{\operatorname{argmax}} \frac{|h_k^H u|^2}{\sum_{j \neq k}(1-\sigma_{kj}^2)\left|(\hat{h}_j^{(k)})^H u\right|^2 + \sum_{j \neq k}\sigma_{kj}^2 + \frac{K}{P}}$$

wherein $\hat{u}_k$ denotes the feedback vector, $h_k$ denotes the downlink channel of the user communication device, $\hat{h}_j^{(k)}$ denotes the quantized downlink channel of the user communication device as known by the further user communication device, K denotes number of user communication devices, and P denotes a total transmission power of the base station.

In a fifth possible implementation form of the user communication device according to the fourth implementation form of the first aspect, the processor is configured to provide information about the adapted feedback vector via the communication interface to the base station by providing an index via the communication interface to the base station, wherein the index is configured to identify the adapted feedback vector in the codebook of feedback vectors.

In a sixth possible implementation form of the user communication device according to the first aspect or any one of the first to fifth implementation form thereof, the communication interface is configured to use an out-band mode for D2D communication.

According to a second aspect the invention relates to a method of operating a user communication device for cellular communication with a base station and D2D communication with at least one further user communication device, wherein the method comprises: receiving channel state information from the further communication device via a D2D communication channel, wherein the channel state information comprises channel state information of a cellular communication channel between the further user communication device and the base station; adapting a feedback vector on the basis of a quality measure of the D2D communication channel between the further user communication device and the user communication device; and providing information about the adapted feedback vector via the communication interface to the base station.

The method according to the second aspect of the invention can be performed by the user communication device according to the first aspect of the invention. Further features of the method according to the second aspect of the invention result directly from the functionality of the user communication device according to the first aspect of the invention and its different implementation forms.

According to a third aspect the invention relates to a base station for cellular communication with a user communication device and a further user communication device using a plurality of antennas. The base station comprises a communication interface configured for cellular communication with the user communication device and the further user communication device using a precoder matrix; and a processor configured to adapt the precoder matrix on the basis of a quality measure of a D2D communication channel between the further user communication device and the user communication device.

In a first possible implementation form of the base station according to the third aspect, the quality measure of the D2D communication channel between the further user communication device and the user communication device is the quantization error $\sigma_{kj}$ of the channel state information of the D2D communication channel between the further user communication device and the user communication device.

In a second possible implementation form of the base station according to the first implementation form of the third aspect, the processor is configured to adapt the precoder matrix on the basis of the quantization error $\sigma_{kj}$ of the channel state information of the D2D communication channel between the further user communication device and the user communication device on the basis of the following equation:

$$W = \left[\hat{U}T(\{\sigma_{kj}\})\hat{U}^H + \left(s(\{\sigma_{kj}\}) + \frac{K}{P}\right)I_{N_t}\right]^{-1}\hat{U}\Psi^{\frac{1}{2}}$$

wherein W denotes the precoder matrix, $\hat{U}$ denotes a matrix defined by feedback vectors $\hat{u}_k$ provided by the user communication device and the further user communication device, K denotes the number of user communication devices, P denotes the total transmission power of the base station, I denotes the identity matrix, $N_t$ denotes the number of transmit antennas of the base station, $\psi$ denotes a positive diagonal matrix for equal power allocation such that the columns of the precoder matrix W have equal norms and wherein the matrix T and the function s are defined by the following equations:

$$T(\{\sigma_{kj}\}) = (1 - 2^{-B/N_t})\left(\Lambda(\{\sigma_{kj}\}) + \frac{K}{P}I_K\right)^2$$

$$s(\{\sigma_{kj}\}) = 2^{-B/N_t}\sum_{k=1}^{k}\left[\sum_{j\neq k}(1-\sigma_k^2) + \frac{1}{N_t}\left(\sum_{j\neq k}\sigma_{kj}^2 + \frac{K}{P}\right)\left(K - 1 + \frac{K}{P} + \sum_{j\neq k}(1-\sigma_{kj}^2)\right)\right]$$

wherein $\nabla$ denotes a diagonal matrix with the kth diagonal element given by $[\nabla]_{(k,k)} = \Sigma_{j\neq k}\sigma_{kj}^2$.

In a third possible implementation form of the base station according to the second implementation form of the third aspect, the feedback vectors $\hat{u}_k$ provided by the user communication device and the further user communication device are based on the following equation:

$$\hat{u}_k = \text{argmax}_{u \in C} \frac{|h_k^H u|^2}{\sum_{j \neq k}(1-\sigma_{kj}^2)\left|\left(\hat{h}_j^{(k)}\right)^H u\right|^2 + \Sigma_{j\neq k}\sigma_{kj}^2 + \frac{K}{P}}$$

wherein $h_k$ denotes the downlink channel of the user communication device and $\hat{h}_j^{(k)}$ denotes the quantized downlink channel of the user communication device as known to the further user communication device.

According to a fourth aspect the invention relates to a method of operating a base station for cellular communication with a user communication device and a further user communication device using a plurality of antennas, wherein the method comprises: adapting a precoder matrix on the basis of a quality measure of a D2D communication channel between the further user communication device and the user communication device; and communicating with the user communication device and the further user communication device using the precoder matrix.

The method according to the fourth aspect of the invention can be performed by the base station according to the third aspect of the invention. Further features of the method according to the fourth aspect of the invention result directly from the functionality of the base station according to the third aspect of the invention and its different implementation forms.

According to a fifth aspect the invention relates to a computer program comprising program code for performing the method according to the second aspect of the invention when executed on a computer.

The invention can be implemented in hardware and/or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It will be appreciated that other aspects may be utilized and structural or logical changes may be made without departing from the scope of the present invention. The following detailed description, therefore, is not to be taken in a limiting sense, as the scope of the present invention is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims embodiments with different functional blocks or processing units are described, which are connected with each other or exchange signals. It will be appreciated that the present invention covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

Figure 1:
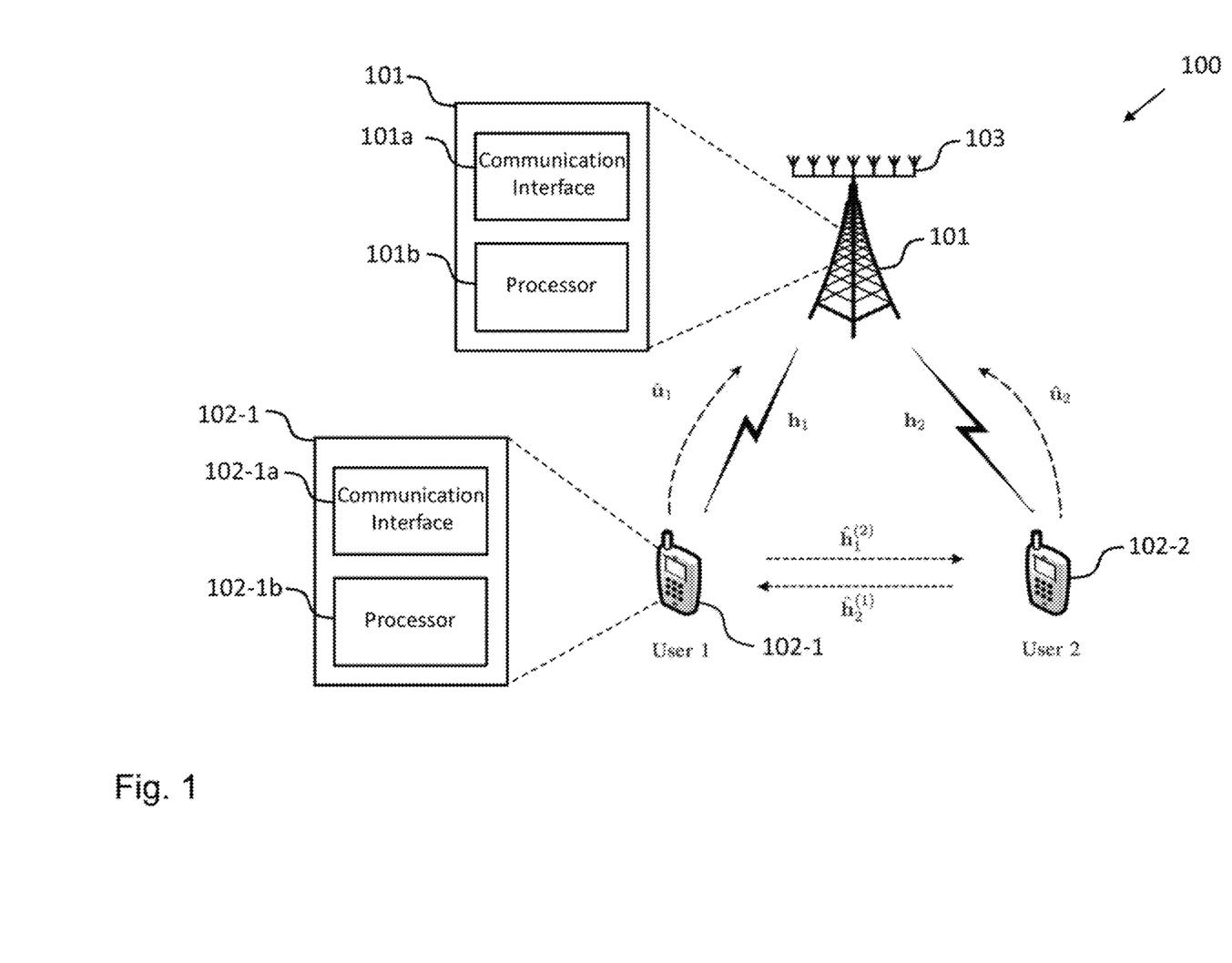
FIG. 1 shows a schematic diagram of a communication network comprising several user communication devices and a base station according to an embodiment.

FIG. 1 shows a schematic diagram of a communication network 100 comprising a first user communication device 102-1 and a further second user communication device 102-2 as well as a MIMO base station 101 according to an embodiment. The user communication device 102-1 is configured for cellular communication with the base station 101 and for D2D communication with the further user communication device 102-2. The cellular communication can be based on a mobile network. In an embodiment, the D2D communication can be in the same frequency band as the cellular communication or in a different frequency band.

The user communication device 102-1 and the further user communication device 102-2, which could be implemented in the form of mobile phones, represent a plurality of K user communication devices. The MIMO base station 101 provides downlinks for K user communication devices, including the user communication device 102-1 and the further user communication device 102-2. The MIMO base station 101 can comprise $N_t$ antennas 103 and be configured to serve the K single antenna user communication devices. In an embodiment, each user communication device k is assumed to know its own communication channel with the base station, i.e. its channel state information (CSI; for instance based on conventional channel estimation techniques), which can be represented by a vector $h_k$ with $N_t$ complex elements that can be assumed to follow a standard independent and identically distributed complex Gaussian distribution.

As can be taken from the detailed view of the first user communication device 102-1 shown in FIG. 1, the first user communication device 102-1 comprises a communication interface 102-1a and a processor 102-1b.

The communication interface 102-1a is configured for cellular communication with the base station 101 and D2D communication via a D2D communication channel between the further user communication device 102-2 and the user communication device 102-1, wherein the D2D communication with the further user communication device 102-2 comprises receiving channel state information (CSI) from the further user communication device 102-2, wherein the CSI comprises the CSI of a cellular communication channel between the further user communication device 102-1 and the base station 101. In an embodiment, the communication interface 102-1a can comprise a separate cellular communication interface for cellular communication with the base station 101 and a separate D2D communication interface for D2D communication with further user communication devices, such as the user communication device 102-2.

The processor 102-1b of the user communication device 102-1 is configured to adapt a feedback vector on the basis of a quality measure of the D2D communication channel between the further user communication device 102-2 and the user communication device 102-1 and to provide information about the adapted feedback vector via the communication interface to the base station.

In an embodiment, the quality measure of the D2D communication channel between the further user communication device 102-2 and the user communication device 102-1 is the quantization error $\sigma_{kj}$ of the channel state information of the D2D communication channel between the further user communication device 102-2 and the user communication device 102-1.

In an embodiment, in case the quality measure of the D2D communication channel between the further user communication device 102-2 and the user communication device 102-1 indicates the D2D communication channel to be perfect (e.g. $\sigma_{kj}=0$), the processor 102-1b is configured to adapt the feedback vector to a precoder vector, wherein the precoder vector is to be applied by the base station 101 for communicating with the user communication device 102-1 via the cellular communication channel, as will be described in more detail further below.

In an embodiment, in case the quality measure of the D2D communication channel between the further user communication device 102-2 and the user communication device 102-1 indicates the D2D communication channel to be absent (e.g. $\sigma_{kj}=1$), the processor 102-1b is configured to adapt the feedback vector to a channel state information vector, wherein the channel state information vector comprises information about the cellular communication channel between the user communication device 102-1 and the base station.

As can be taken from the detailed view of the base station 101 shown in FIG. 1, the base station 101 comprises a communication interface 101a and a processor 101b. The communication interface 101a of the base station 101 is configured for cellular communication with the user communication device 102-1 and the further user communication device 102-2 using a precoder matrix. The processor 101b of the base station 101 is configured to adapt the precoder matrix on the basis of a quality measure of a D2D communication channel between the further user communication device 102-2 and the user communication device 102-1, as will be described in more detail further below.

As already mentioned above, in parallel to the cellular communications between the user communication devices 102-1, 102-2 and the base station 101, the user communication devices 102-1 and 102-2 are configured to establish a D2D communication link for direct signaling between each other. By means of the D2D communication links the user communication devices 102-1 and 102-2 can share their respective CSI directly with each other. In an embodiment, the user communication devices 102-1, 102-2 are configured to compress their respective CSI using quantization at a code rate (i.e., the number of bits to represent the quantized version of the communication channel $h_k$) equal to the D2D communication link capacity. More specifically, in an embodiment, the CSI $\hat{h}_1$ of a user communication device j known by another user communication device k is denoted as $\hat{h}_j^{(k)}$, and modeled as $$\hat{h}_j = \sqrt{1-\sigma_{kj}^2}\hat{h}_j^{(k)} + \sigma_{kj}\xi_j^{(k)},$$

Wherein, as already mentioned above, $\sigma_{kj}$ denotes the quantization error or D2D CSI noise (i.e., the variance of CSI quantization error due to a finite rate D2D communication), and $\xi_j^{(k)}$ denotes the quantization noise that is standard complex Gaussian distributed and uncorrelated to $\hat{h}_j^{(k)}$.

After the CSI sharing, a user communication device k has the imperfect global CSI $\hat{H}_k$ (a $N_t \times K$ matrix) in the following form $$\hat{H}_k = [\hat{h}_1^{(k)}, \hat{h}_2^{(k)}, \ldots \hat{h}_{k-1}^{(k)}, h_k, \hat{h}_{k+1}^{(k)}, \ldots, \hat{h}_K^{(k)}].$$

Each user communication device 102-1, 102-2 can provide feedback to the base station 101 at a rate of B bits. In an embodiment, each user communication device 102-1, 102-2 can feed an index of an entry in a codebook $C_k$ that contains $2^B$ entries back to the base station 101. The codebook $C_k$ can be designed by using $2^B$ unit norm vectors with $N_t$ dimensions to uniformly pack on the hyper-sphere embedded in the $N_t$ dimensional space. In practice, this can be approximately achieved using random vectors:

$$C_k = \{v_i : v_i = \xi_i / \|\xi_i\|, i=1,2,\ldots,2^B\},$$

wherein $\xi_i$ are random vectors following a standard $N_t$-dimensional complex Gaussian distribution.

Based on the total KB bits of the feedback from the user communication devices 102-1, 102-2, the base station 101 can compute a precoder matrix W for the downlink transmission. The downlink received signal $y=[y_1, y_2, \ldots, y_K]^T$ at the user communication device 102-1, 102-2 is given by $$y = H^H W x + n,$$

wherein x denotes a K dimensional vector containing message symbols for the K user communication devices respectively and n denotes the noise.

In an embodiment, the feedback vector $\hat{u}_k$ for each user communication device k is chosen by minimizing the mean-squared-error:

$$tr\{\mathbb{E}\{(y-x)(y-x)^H | \hat{H}_k\}\},$$

conditioned on user communication device k's imperfect global CSI $\hat{H}_k$.

At the base station 101, given the feedback $\hat{U}=[\hat{u}_1, \hat{u}_2, \ldots, \hat{u}_K]$, the precoder matrix is computed to minimize the conditional mean-squared-error:

$$tr\{\mathbb{E}\{(y-x)(y-x)^H | \hat{U}\}\}.$$

In an embodiment, each user communication device k feeds the following vector back to the base station 101:

$$\hat{u}_k = \text{argmax}_{u \in C} \frac{|h_k^H u|^2}{\sum_{j \neq k}(1-\sigma_{kj}^2)\left|(\hat{h}_j^{(k)})^H u\right|^2 + \sum_{j \neq k}\sigma_{kj}^2 + \frac{K}{P}},$$

wherein $\hat{u}_k$ denotes the feedback vector, $h_k$ denotes the downlink channel of the user communication device k, $\hat{h}_j^{(k)}$ denotes the quantized downlink channel of the user communication device k as known to the user communication device j, $\sigma_{kj}$ denotes the quantization error of the D2D channel state information shared from the user communication device j to the user communication device k, K denotes total number of user communication devices, and P denotes total transmission power of the base station 101.

In an embodiment, the processor 101b of the base station 101 computes the precoder as follows:

$$W = \left[\hat{U}T(\{\sigma_{kj}\})\hat{U}^H + \left(s(\{\sigma_{kj}\}) + \frac{K}{P}\right)I_{N_t}\right]^{-1}\hat{U}\Psi^{\frac{1}{2}},$$

where $$T(\{\sigma_{kj}\}) = (1 - 2^{-B/N_t})\left(\Lambda(\{\sigma_{kj}\}) + \frac{K}{P}I_K\right)^2,$$

and $$s(\{\sigma_{kj}\}) = 2^{-B/N_t}$$

$$\sum_{k=1}^{K}\left[\sum_{j \neq k}(1-\sigma_{kj}^2) + \frac{1}{N_t}\left(\sum_{j \neq k}\sigma_{kj}^2 + \frac{K}{P}\right)(K-1+KP+j \neq k1 - \sigma k j2,\right.$$

wherein W denotes the precoder matrix, $\hat{U}$ denotes a matrix defined by feedback vectors $\hat{u}_k$ provided by the user communication device 102-1 and the further user communication device 102-2, K denotes the number of user communication devices, P denotes the total transmission power of the base station, I denotes the identity matrix, $N_t$ denotes the number of transmit antennas 103 of the base station 101, $\psi$ denotes a positive diagonal matrix for equal power allocation such that the columns of the precoder matrix W have equal norms and $\Lambda$ denotes a diagonal matrix with the kth diagonal element given by $[\nabla]_{(k,k)} = \Sigma_{j \neq k}\sigma_{kj}^2$.

Figure 2:
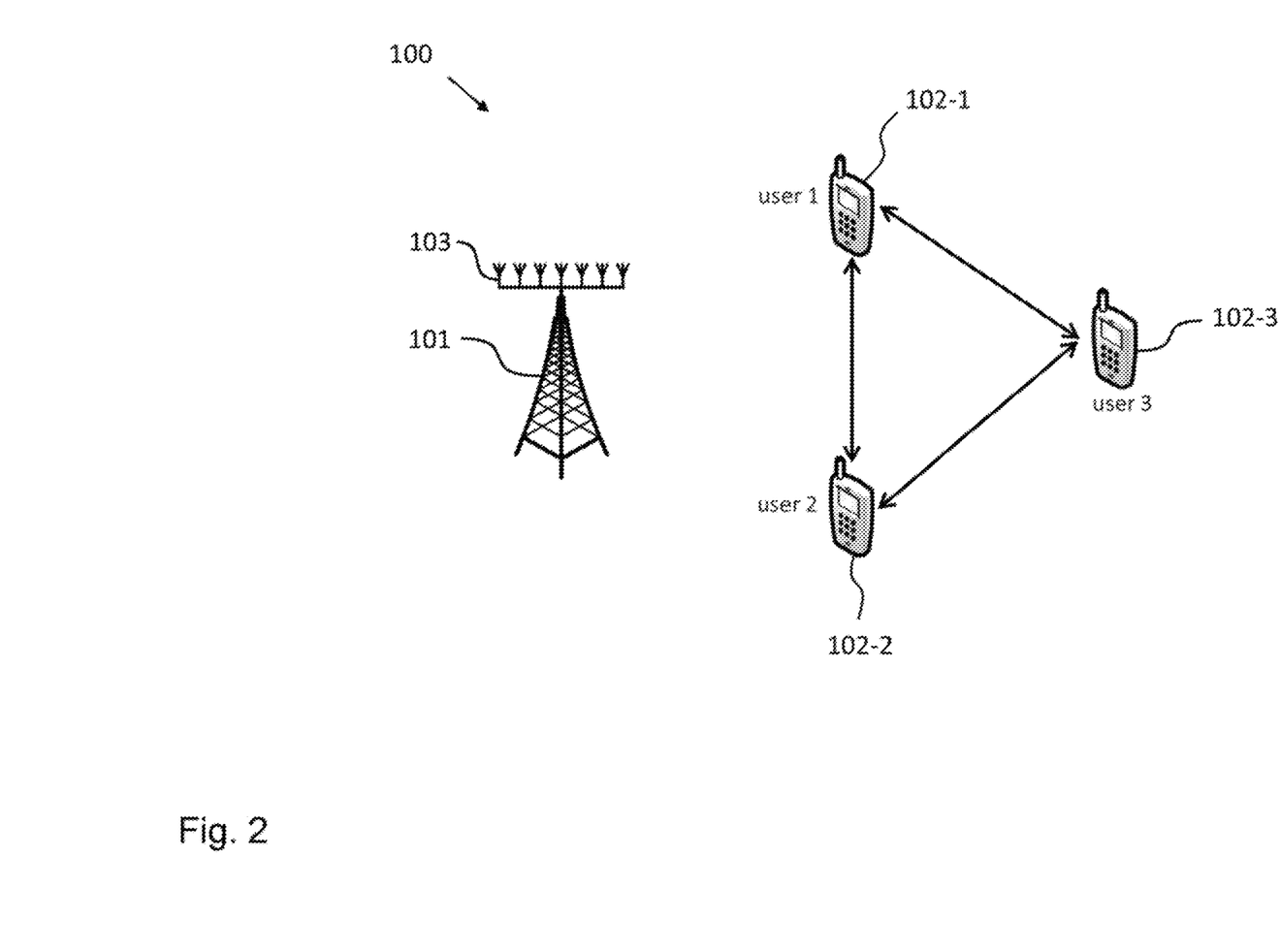
FIG. 2 shows a schematic diagram of a communication network comprising several user communication devices and a base station according to an embodiment in a first communication scenario.

FIG. 2 shows a schematic diagram of a communication network 100 comprising the first user communication device 102-1, the second user communication device 102-2, a third user communication device 102-3, and the base station 101 according to an embodiment in a first communication scenario.

In the first communication scenario shown in FIG. 2, all user communication device 102-1, 102-2, and 102-3 can have the same or a similar D2D quality, i.e. all user communication device 102-1, 102-2, and 102-3 use the same or a similar number of bits to share their respective CSI and the quantized CSI shared between them has the same quantization error a. Embodiments of the invention can be applied to a more general scenario, where a different number of user communication devices are associated with different quantization errors.

Figure 3:
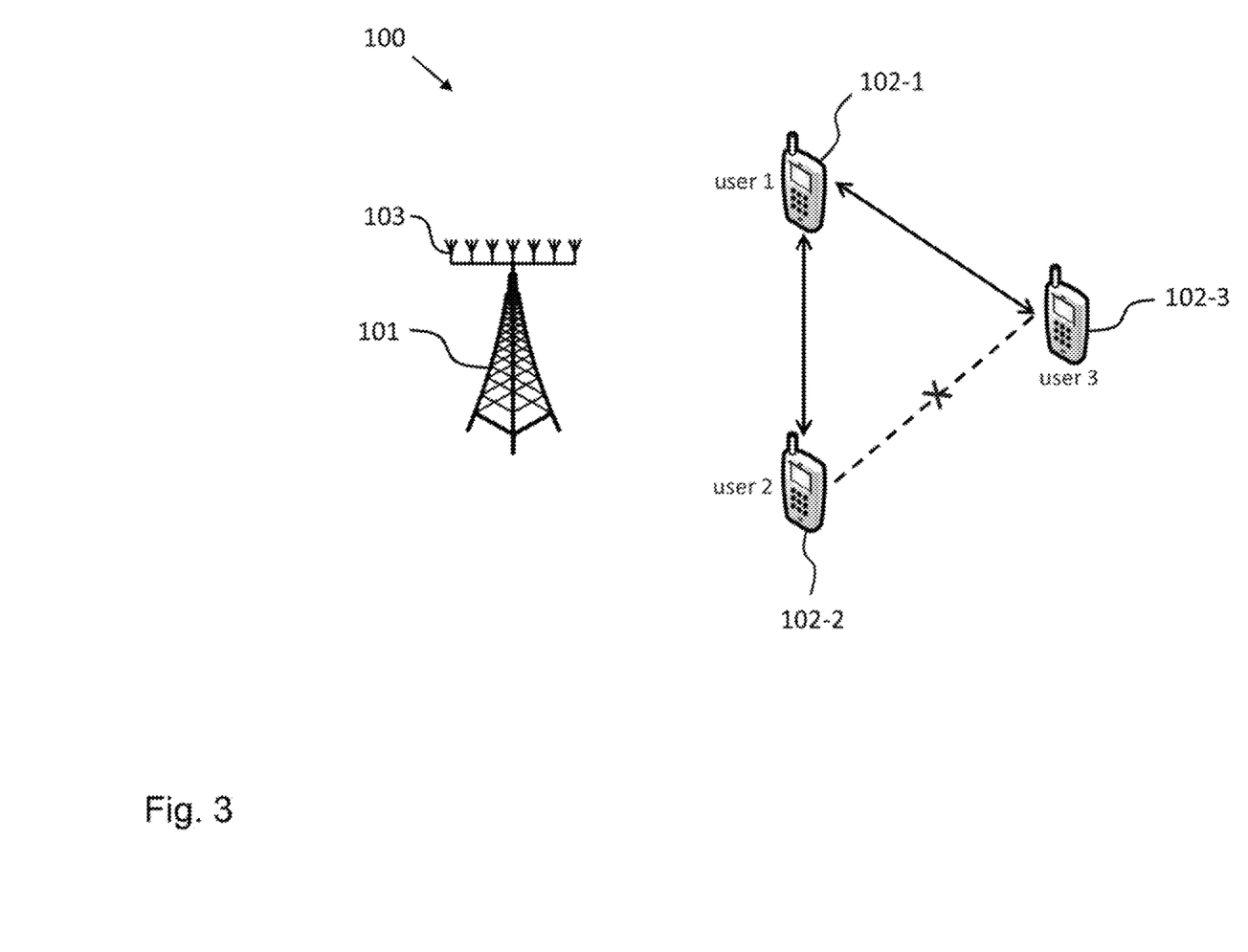
FIG. 3 shows a schematic diagram of a communication network comprising several user communication devices and a base station according to an embodiment in a second communication scenario, where the D2D communication link between one pair of user communication devices is absent.

FIG. 3 shows a schematic diagram of the communication network 100 shown in FIG. 2 in a second communication scenario. In this second communication scenario, the quantized CSI shared between the first user communication device 102-1 and the second user communication device 102-2, and the quantized CSI shared between the first user communication device 102-1 and the third user communication device 102-3 can have the same or a similar D2D quality, i.e., the quantized CSI between the first user communication device 102-1 and the second user communication device 102-2, and the quantized CSI between the first user communication device 102-1 and the third user communication device 102-3 have the same or a similar quantization error σ. However, in this scenario the D2D communication link between the second user communication device 102-2 and the third user communication device 102-3 is absent. Also this second scenario can be beneficially handled by embodiments of the invention.

Figure 4:
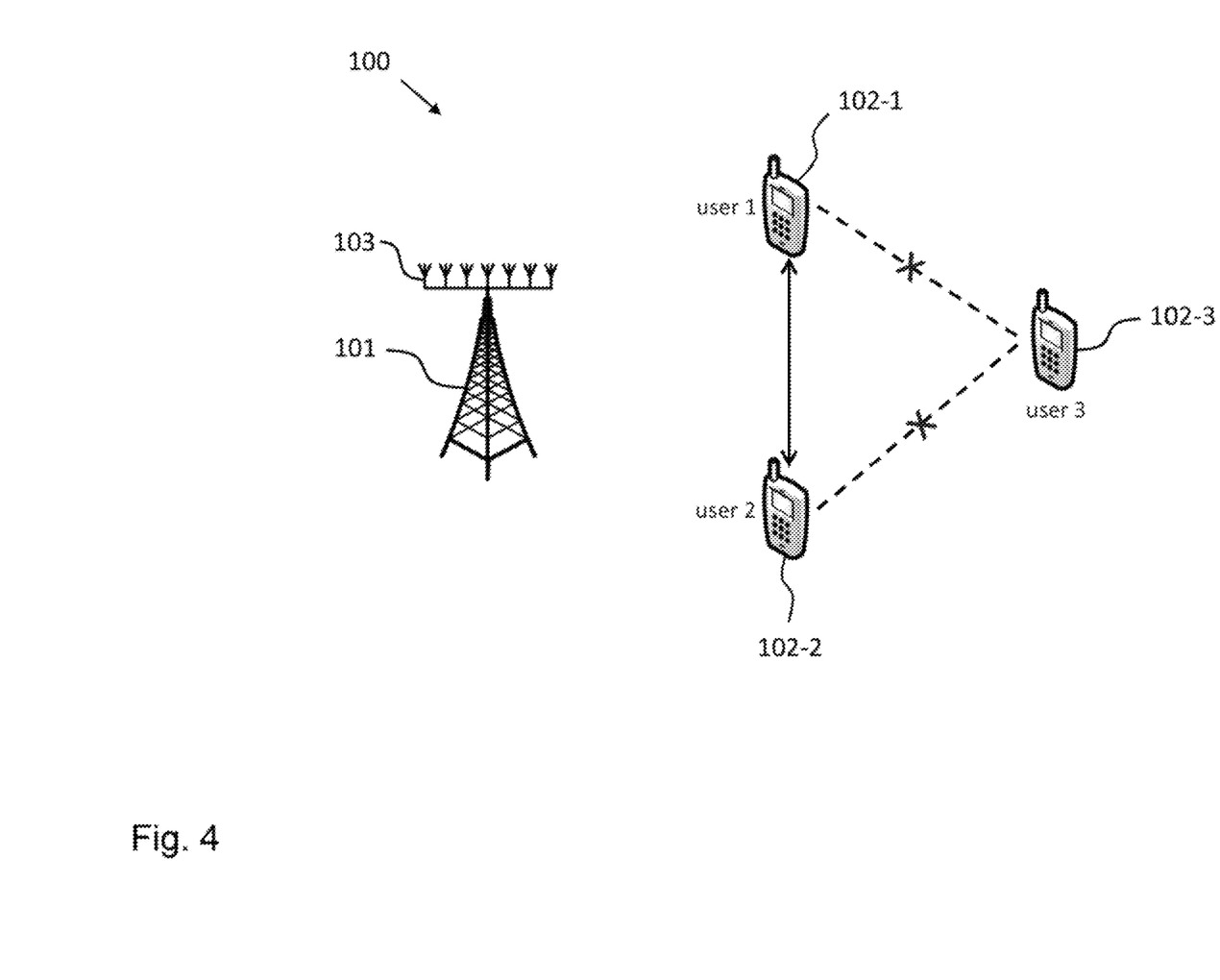
FIG. 4 shows a schematic diagram of a communication network comprising several user communication devices and a base station according to an embodiment in a third communication scenario, wherein the respective D2D communication link between two respective pairs of user communication devices is absent.

FIG. 4 shows a schematic diagram of the communication network 100 shown in FIGS. 2 and 3 in a third communication scenario. In this third communication scenario, the quantized CSI shared between the first user communication device 102-1 and the second user communication device 102-2 can have a quantization error σ. However, in this scenario the third user communication device 102-3 does not possess D2D communication capability, i.e., the D2D communication link between the first user communication device 102-1 and the third user communication device 102-3, as well as the D2D communication link between the second user communication device 102-2 and the third user communication device 102-3 are absent. Also this third scenario can be beneficially handled by embodiments of the invention.

Figure 5:
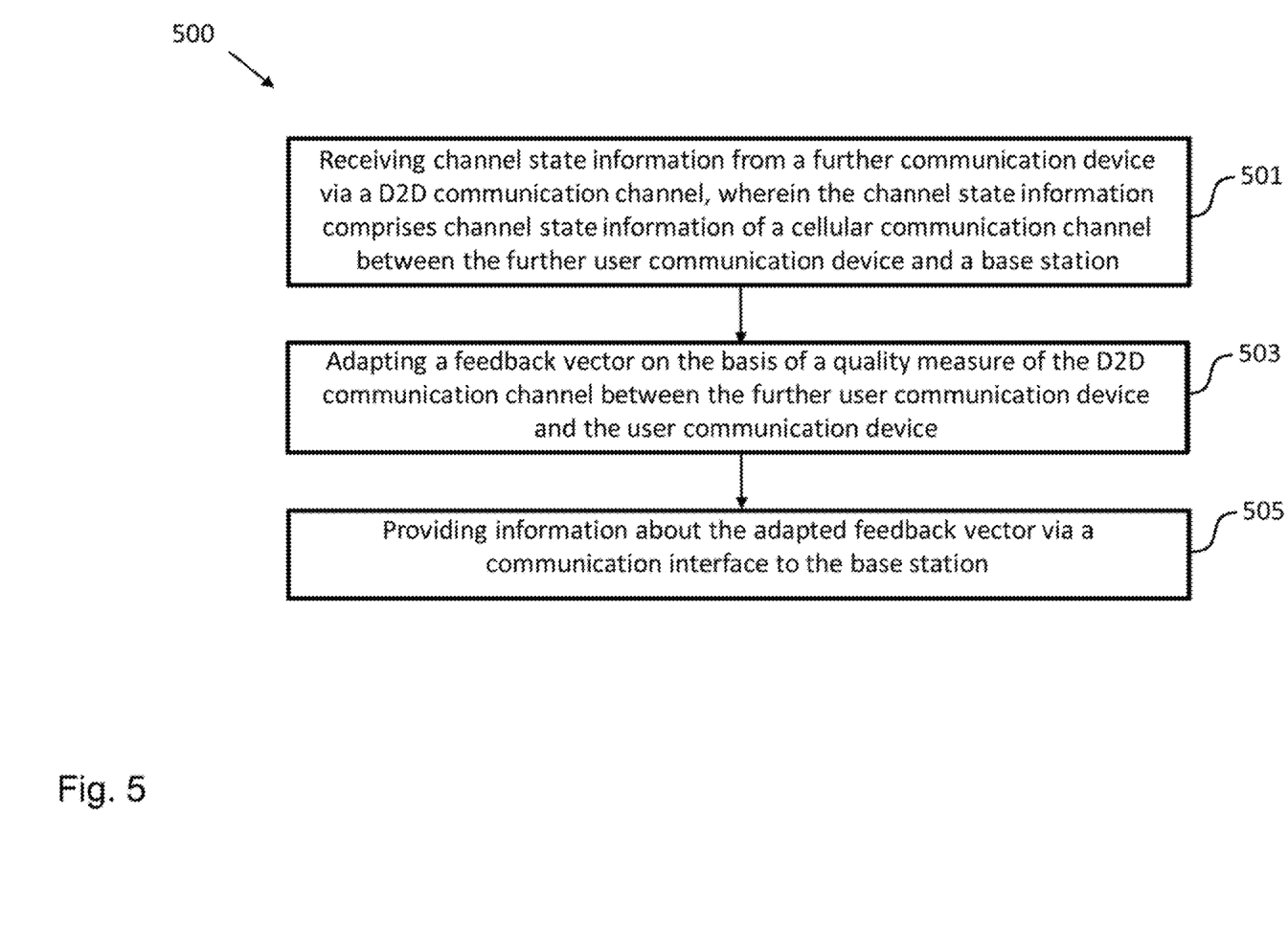
FIG. 5 a schematic diagram illustrating a method of operating a user communication device according to an embodiment.

FIG. 5 shows a schematic diagram of a method 500 of operating a user communication device, for instance the user communication device 102-1 shown in FIG. 1, for cellular communication with a base station, for instance the base station 101 shown in FIG. 1, and D2D communication with at least one further user communication device, such as the user communication device 102-2 shown in FIG. 1.

The method 500 includes a first step 501 of receiving channel state information from the further communication device 102-2 via a D2D communication channel, wherein the channel state information comprises channel state information of a cellular communication channel between the further user communication device 102-2 and the base station 101.

The method 500 includes a second step 503 of adapting a feedback vector on the basis of a quality measure of the D2D communication channel between the further user communication device 102-2 and the user communication device 102-1.

Finally, the method 500 includes a third step 505 of providing information about the adapted feedback vector via the communication interface to the base station 101.

Figure 6:
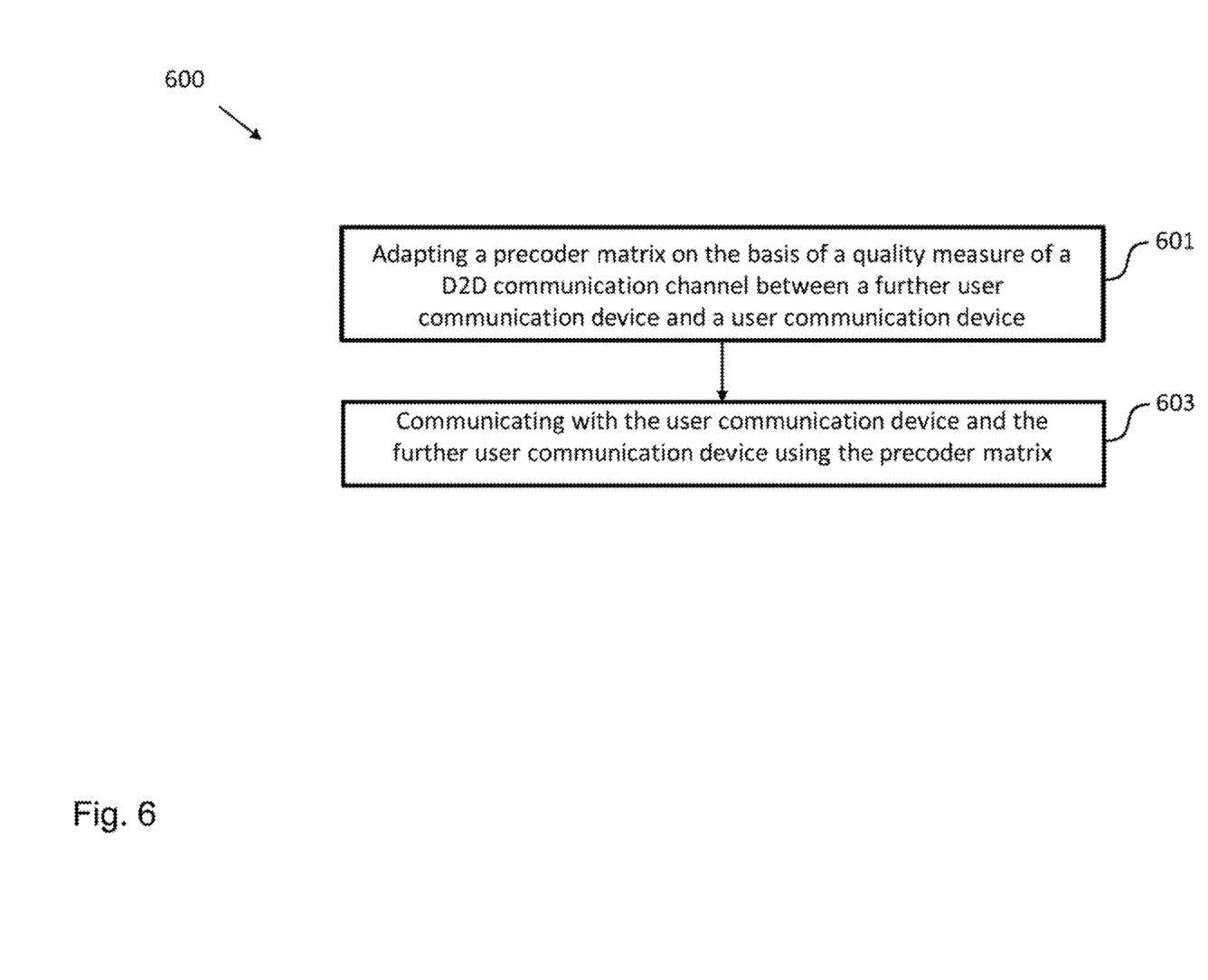
FIG. 6 a schematic diagram illustrating a method of operating a base station according to an embodiment.

FIG. 6 shows a schematic diagram of a method 600 of operating a base station, such as the base station 101 in FIG. 1, for cellular communication with a user communication device, such as the user communication 102-1 in FIG. 1 and a further user communication device, such as the further user communication device 102-2 in FIG. 1, using a plurality of antennas, such as the antennas 103 in FIG. 1.

The method 600 includes a first step 601 of adapting a precoder matrix on the basis of a quality measure of a D2D communication channel between the further user communication device 102-2 and the user communication device 102-1.

The method 600 includes a further step 603 of communicating with the user communication device 102-1 and the further user communication device 102-2 using the precoder matrix.

In the embodiments of the invention, the proposed method tries to strike a balance between the minimum mean square error (MMSE) precoding scheme from a base station and the maximum signal-to-leakage-and-noise ratio (SLNR) precoding scheme from a user communication device by smoothly regularizing these two precoding schemes.

It is to be understood that, in the ideal case with perfect CSI sharing among user communication devices and perfect (infinite rate) feedback from the user communication devices to the base station, the MMSE precoding at the base station and the SLNR precoding at the user communication device are equivalent. However, in the situation with a perfect CSI sharing among user communication devices and imperfect (limited rate) feedbacks from the user communication devices to the base station, the SLNR precoding at the user communication device achieves a higher throughput than the MMSE precoding at the base station.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A user communication device for cellular communication with a base station and device-to-device (D2D) communication with at least one further user communication device, wherein the user communication device comprises:
 a communication interface configured for cellular communication with the base station and D2D communication via a D2D communication channel between the further user communication device and the user communication device, wherein the D2D communication with the further user communication device comprises receiving channel state information from the further communication device, wherein the channel state information comprises channel state information of a cellular communication channel between the further user communication device and the base station; and
 a processor configured to adapt a feedback vector on the basis of a quality measure of the D2D communication channel between the further user communication device and the user communication device and to provide information about the adapted feedback vector via the communication interface to the base station.

2. The user communication device of claim 1, wherein, in a case that the quality measure of the D2D communication channel between the further user communication device and the user communication device indicates the D2D communication channel to be perfect, the processor is configured to adapt the feedback vector to a precoder vector, wherein the precoder vector is to be applied by the base station for communicating with the user communication device via the cellular communication channel.

3. The user communication device of claim 1, wherein, in a case that the quality measure of the D2D communication channel between the further user communication device and the user communication device indicates the D2D communication channel to be absent, the processor is configured to adapt the feedback vector to a channel state information vector, wherein the channel state information vector comprises information about the cellular communication channel between the user communication device and the base station.

4. The user communication device of claim 1, wherein the quality measure of the D2D communication channel between the further user communication device and the user communication device is the quantization error $\sigma_{kj}$ of the channel state information of the D2D communication channel between the further user communication device and the user communication device.

5. The user communication device of claim 4, wherein the processor is configured to adapt the feedback vector on the basis of the quantization error $\sigma_{kj}$ of the channel state information of the D2D communication channel between the further user communication device and the user communication device by determining a feedback vector from a codebook of feedback vectors, which satisfies the following equation:

$$\hat{u}_k = \mathrm{argmax}_{u \in C} \frac{|h_k^H u|^2}{\sum_{j \neq k} (1-\sigma_{kj}^2)\left|(\hat{h}_j^{(k)})^H u\right|^2 + \sum_{j \neq k} \sigma_{kj}^2 + \frac{K}{P}},$$

wherein $\hat{u}_k$ denotes the feedback vector, $h_k$ denotes a downlink channel of the user communication device, $\hat{h}_j^{(k)}$ denotes a quantized downlink channel of the user communication device as known by the further user communication device, K denotes a number of user communication devices, and P denotes a total transmission power of the base station.

6. The user communication device of claim 5, wherein the processor is configured to provide information about the adapted feedback vector via the communication interface to the base station by providing an index via the communication interface to the base station, wherein the index is configured to identify the adapted feedback vector in the codebook of feedback vectors.

7. The user communication device of claim 1, wherein the communication interface is configured to use an out-band mode for D2D communication.

8. A method of operating a user communication device for cellular communication with a base station and device-to-device (D2D) communication with at least one further user communication device, wherein the method comprises:
receiving channel state information from the further communication device via a D2D communication channel, wherein the channel state information comprises channel state information of a cellular communication channel between the further user communication device and the base station;
adapting a feedback vector on the basis of a quality measure of the D2D communication channel between the further user communication device and the user communication device; and
providing information about the adapted feedback vector to the base station.

9. A base station for cellular communication with a user communication device and a further user communication device using a plurality of antennas, wherein the base station comprises:

a communication interface configured for cellular communication with the user communication device and the further user communication device using a precoder matrix; and
a processor configured to adapt the precoder matrix on the basis of a quality measure of a device-to-device (D2D) communication channel between the further user communication device and the user communication device, wherein the quality measure of the D2D communication channel between the further user communication device and the user communication device is a quantization error $\sigma_{kj}$ of channel state information of the D2D communication channel between the further user communication device and the user communication device.

10. The base station of claim 9, wherein the processor is configured to adapt the precoder matrix on the basis of the quantization error $\sigma_{kj}$ of the channel state information of the D2D communication channel between the further user communication device and the user communication device on the basis of the following equation:

$$W = \left[\hat{U}T(\{\sigma_{kj}\})\hat{U}^H + \left(\sigma(\{\sigma_{kj}\}) + \frac{K}{P}\right)I_{N_t}\right]^{-1}\hat{U}\Psi^{\frac{1}{2}},$$

wherein W denotes the precoder matrix, U denotes a matrix defined by feedback vectors $\hat{u}_k$ provided by the user communication device and the further user communication device, K denotes a number of user communication devices, P denotes a total transmission power of the base station, I denotes an identity matrix, $N_t$ denotes a number of transmit antennas of the base station, $\Psi$ denotes a positive diagonal matrix for equal power allocation such that the columns of the precoder matrix W have equal norms and wherein the matrix T and the function s are defined by the following equations:

$$T(\{\sigma_{kj}\}) = (1 - 2^{-B/N_t})\left(\Lambda(\{\sigma_{kj}\}) + \frac{K}{P}I_K\right)^2$$

$$s(\{\sigma_{kj}\}) = 2^{-B/N_t}\sum_{k=1}^{K}\left[\sum_{j \neq k}(1-\sigma_{kj}^2) + \frac{1}{N_t}\left(\sum_{j \neq k}\sigma_{kj}^2 + \frac{K}{P}\right)\left(K-1+\frac{K}{P}+\sum_{j \neq k}(1-\sigma_{kj}^2)\right)\right]$$

wherein $\Lambda$ denotes a diagonal matrix with the kth diagonal element given by $[\Lambda]_{(k,k)} = \Sigma_{j \neq k}\sigma_{kj}^2$.

11. The base station of claim 10, wherein the feedback vectors $\hat{u}_k$ provided by the user communication device and the further user communication device are based on the following equation:

$$\hat{u}_k = \mathrm{argmax}_{u \in C} \frac{|h_k^H u|^2}{\sum_{j \neq k} (1-\sigma_{kj}^2)\left|\hat{h}_k^H u\right|^2 + \sum_{j \neq k} \sigma_{kj}^2 + \frac{K}{P}},$$

wherein $h_k$ denotes q downlink channel of the user communication device and $\hat{h}_j^{(k)}$ denotes q quantized downlink channel of the user communication device as known by the further user communication device.

12. A method of operating a base station for cellular communication with a user communication device and a further user communication device using a plurality of antennas, wherein the method comprises:
adapting a precoder matrix on the basis of a quality measure of a device-to-device (D2D) communication channel between the further user communication device and the user communication device; and
communicating with the user communication device and the further user communication device using the precoder matrix, wherein the quality measure of the D2D communication channel between the further user communication device and the user communication device is a quantization error $\sigma_{kj}$ of channel state information of the D2D communication channel between the further user communication device and the user communication device.

13. A non-transitory memory comprising program code which, when executed on a computer, causes a user communication device to:
receive channel state information from a further communication device via a device-to-device (D2D) communication channel, wherein the channel state information comprises channel state information of a cellular communication channel between the further user communication device and a base station, wherein the user communication device is configured to perform cellular communication with the base station and D2D communication with the further user communication device;
adapting a feedback vector on the basis of a quality measure of the D2D communication channel between the further user communication device and the user communication device; and
providing information about the adapted feedback vector to the base station.

14. A non-transitory memory comprising program code which, when executed on a computer, causes a base station to:
adapt a precoder matrix on the basis of a quality measure of a device-to-device (D2D) communication channel between a further user communication device and a user communication device, wherein the base station is configured to perform cellular communication with the user communication device and the further user communication device; and
communicate with the user communication device and the further user communication device using the precoder matrix;
wherein the quality measure of the D2D communication channel between the further user communication device and the user communication device is a quantization error $\sigma_{kj}$ of channel state information of the D2D communication channel between the further user communication device and the user communication device.

* * * * *

UNITED STATES PATENT AND TRADEMARK OFFICE
CERTIFICATE OF CORRECTION

PATENT NO. : 10,666,328 B2
APPLICATION NO. : 16/394788
DATED : May 26, 2020
INVENTOR(S) : Chen Page 1 of 1

It is certified that error appears in the above-identified patent and that said Letters Patent is hereby corrected as shown below:

In the Claims

In Column 14, Line 25, Claim 10, delete the equation and insert:

$$\mathbf{W} = \left[\hat{\mathbf{U}}\mathbf{T}(\{\sigma_{kj}\})\hat{\mathbf{U}}^H + \left(s(\{\sigma_{kj}\}) + \frac{K}{P}\right)\mathbf{I}_{N_t}\right]^{-1}\hat{\mathbf{U}}\,\Psi^{\frac{1}{2}},$$

--.

In Column 14, Line 64, Claim 11, delete the equation and insert:

$$\hat{\mathbf{u}}_k = \arg\max\nolimits_{\mathbf{u}\in\mathcal{C}} \frac{|\mathbf{h}_k^H \mathbf{u}|^2}{\sum_{j\neq k}(1-\sigma_{kj}^2)|(\hat{\mathbf{h}}_j^{(k)})^H\mathbf{u}|^2 + \sum_{j\neq k}\sigma_{kj}^2 + \frac{K}{P}},$$

--.

Signed and Sealed this
Eighteenth Day of August, 2020

Andrei Iancu
*Director of the United States Patent and Trademark Office*